R. L. DAVIDSON.
BAKERY MACHINERY.
APPLICATION FILED APR. 18, 1916.
1,248,629.
Patented Dec. 4, 1917.
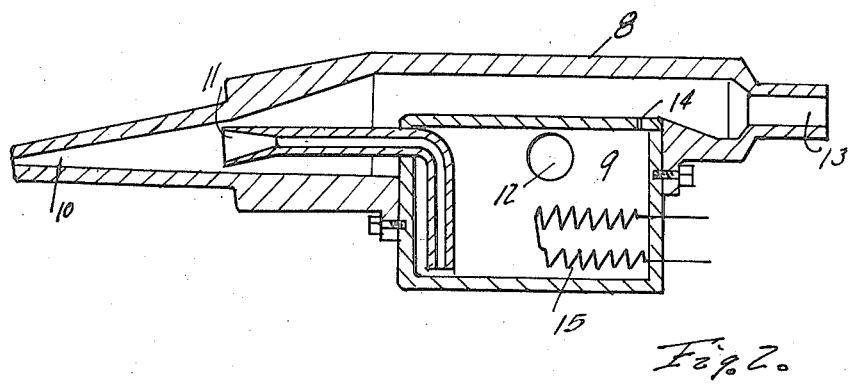
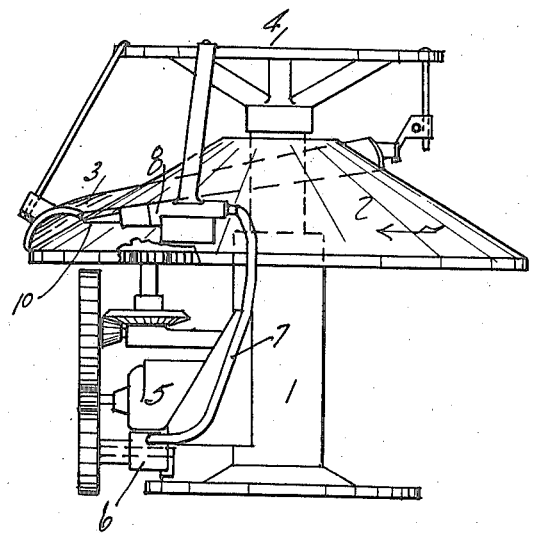
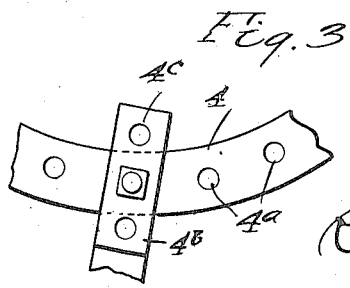
INVENTOR
Robert L. Davidson
BY
ATTORNEY

UNITED STATES PATENT OFFICE.

ROBERT L. DAVIDSON, OF SEATTLE, WASHINGTON.

BAKERY MACHINERY.

1,248,629. Specification of Letters Patent. Patented Dec. 4, 1917.

Application filed April 18, 1916. Serial No. 91,845.

*To all whom it may concern:*

Be it known that I, ROBERT L. DAVIDSON, a citizen of the United States, and a resident of Seattle, in the county of King and State of Washington, have invented certain new and useful Improvements in Bakery Machinery, of which the following is a full, true, and exact specification.

My invention relates to bakery machinery and has for its principal object to provide an improved and novel device for continuously and evenly coating the loaves of dough with oil or the like in order to prevent sticking of the dough to the machinery and to improve the quality of the bread; to provide a device of the class described which is operated as an integral part of a dough rounding machine. In bakeries, bread dough is handled mostly by machinery and in order to prevent the dough from sticking to the machinery, flour is usually sifted liberally at various points in the machinery. The flour does not entirely prevent sticking, is expensive and litters the entire bakery. The use of oil sprayed on the part of the machine which contacts with the dough, prevents sticking and keeps the machine clean. Dough rolled in a sprayed machine, obviates the necessity of greasing the baking pan. My device obviates the above difficulties and does better work at a less cost. Dough sprayed with my device works out in a rounding machine much quicker than when flour is used.

Other objects will appear as my invention is more fully explained in the following specification, illustrated in the accompanying drawings and pointed out in the appended claims.

In the drawings, Figure 1 is a side elevation of a rounding machine with my sprayer as an integral part thereof. Fig. 2 is an enlarged central section of my sprayer. Fig. 3 is an enlarged plan view of means for adjusting the sprayer.

Referring more particularly to the drawings, numeral 1 indicates the base of a rounding machine with a revolving cone shaped table 2 and a spiral grooved shaper 3. A head frame 4 supports the shaper 3. Operating machinery which includes a motor 5 and a train of gears is mounted on base 1 and is geared to the revolving cone 2. A rotary compressor 6 is geared to the motor and supplies air through a line 7 to my sprayer. The sprayer includes an outer casing 8, spraying nozzle 10 and oil siphon 11. The oil reservoir is separable from the casing 8 and has a filling plug 12. The pipe 7 is attachable to a connection 13. The sprayer is suspended from the head frame 4. Frame 4 is provided with holes 4ª for adjustably securing the sprayer by an arm 4ᵇ which is also provided with adjustment holes 4ᶜ. When the rounding machine is not operating, no oil is furnished and the sprayer is cut out. The sprayer may be used in connection with other machines than rounders if desired. A sniff hole 14 admits air to the oil receiver 9. My device is cleaner, produces better shaped loaves, is more sanitary and increases the capacity of the bakery besides preventing sticking. The sprayer is mounted to spray upon the loaf as it enters the rounder. A heating element 15 is preferably used to warm the oil.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

1. In a device of the class described, the combination of a sprayer including a separable oil receptacle, compressor, dough forming means, means for adjustably attaching the sprayer to the said forming means in such a way as to direct the spray against the dough, an air supply line connected to said sprayer and compressor, shaping means operable in connection with the said forming means.

2. In combination with forming means, an oil spraying device for dough forming machines, the combination of an oil receptacle, an outer casing mounted on said oil receptacle, a spray nozzle integral with said casing and directed to discharge oil against the dough and an oil siphon, one end of which dips into the oil receptacle and the other end of which projects into the said nozzle, whereby the flow of air through said nozzle will siphon oil from the receptacle.

ROBERT L. DAVIDSON.